FIG. 1.

Inventors
MATTHEW P. WARNER & SELIG S. LIESE.
By Edwin Levisohn
Attorney

May 4, 1943.                M. P. WARNER ET AL                2,318,118
          SELECTIVE AUTOMATIC APPARATUS FOR REPRODUCING
                    IMAGES FROM RECORDS THEREOF
                    Filed July 29, 1940        6 Sheets-Sheet 2

FIG. 2.

Inventors
MATTHEW P. WARNER & SELIG S. LIESE.

By
Attorney

Inventors
MATTHEW P. WARNER & SELIG S. LIESE.
By Edwin Perisho
Attorney

Patented May 4, 1943

2,318,118

UNITED STATES PATENT OFFICE 2,318,118

SELECTIVE AUTOMATIC APPARATUS FOR REPRODUCING IMAGES FROM RECORDS THEREOF

Matthew P. Warner and Selig S. Liese, Freeport, N. Y., assignors to Barney Rosenberg and Samuel W. Fried, New York, N. Y., as trustees Application July 29, 1940, Serial No. 348,100

11 Claims. (Cl. 178—5.6)

The present invention relates to selective automatic apparatus for reproducing sound and motion pictures or other visual images from records thereof.

One object of the invention is the provision of apparatus constructed and arranged to operate selectively and automatically for reproducing any one of a plurality of vision records, for example, motion picture films, preferably with an accompanying reproduction of sound without requiring the use of motion picture projection apparatus of the optical type. More specifically, in accordance with this object of the invention, the motion pictures are reproduced by electronic current actuated or responsive means such for example ray tubes employed in the television art.

Another object of the invention is the provision of apparatus of the character referred to arranged in a cabinet and provided with means which may be coin-controlled for selecting the record to be reproduced and for effecting the reproduction of said record. Motion picture apparatus of this type is well adapted for use in various public places, as well as in the home, for entertainment or advertising purposes.

Another object of the invention is the provision of improved film-moving means in which sprockets or the like are eliminated. More particularly, in accordance with this object of the invention the film-moving means comprises companion friction rollers which engage the film at opposite sides thereof, one of said rollers being driven and the other being preferably freely rotatable.

When the apparatus is selective as in the embodiment illustrated and described herein, said freely rotatable or non-driven roller is mounted for movement under the control of a coin-controlled selector toward and away from the companion driving roller, that is, from retracted position, out of engagement with the film to projected or film-moving position, in engagement with the film. In the preferred embodiment of the invention, the means for moving said non-driven rollers comprises a plurality of electro-magnets, one for each roller, operatively connected to said rollers, respectively, and arranged to be energized selectively for moving said non-driven rollers to the projected or film-moving positions thereof, the movement of said rollers to their retracted or inoperative positions taking place automatically when the companion magnets are de-energized. The provision of selectively operable means of this character constitutes another object of the invention.

A further object of the invention is to provide film-moving means of the character described in combination with reels for the several films constructed and arranged so that in the operation of a selected film the latter is automatically rewound during the reproduction of the pictures or sound carried by the successive portions of the films whereby to obviate the necessity for rewinding the film after the actuation of the apparatus for reproducing the same. In other words the same film can be operated as often as desired without intermediate rewindings of the film between successive reproductions thereof. Further, the provision of reels of this character permits the apparatus including a plurality of films to be mounted within a relatively small cabinet and also eliminates rewinding devices whereby further to reduce the size of the cabinet.

Another object of the invention is the provision in conjunction with motion picture apparatus of the character described of a novel picture pick-up device and of a novel method of scanning the film.

Another object of the invention is to provide selective apparatus of the character described with an image pick-up device, for example a cathode-ray transmitting tube, which is mounted for movement in relation to a plurality of films and which is selectively operable to be automatically positioned in registered position or operative association with one or more selected films. Also, in respect to this phase of the invention, at least part of the sound pick-up means, preferably the exciter lamp and light slit device, is similarly automatically movable in relation to the several films.

The above objects of the invention and other objects which might hereinafter appear will be fully understood from the following description considered with reference to the accompanying drawings which, however, are to be considered as illustrative of the invention but not in limitation thereof.

Referring now to the drawings in detail, the apparatus as here shown comprises a cabinet 10 having at the upper front portion thereof an opening 11 with respect to which a kinescope or other cathode-ray vision tube 12 is positioned. Said tube is mounted in the cabinet in any suitable way, for example by plates 14 and 16 in the compartment above the partition 18. The sound reproducing unit or loud speaker 17 is arranged at the front of the cabinet below screen 11, and the selector 20, usually coin-controlled is mounted for convenient access at the front wall 21 of the cabinet above the loud speaker.

A plurality of film reels 22 each carrying an endless film and constructed and arranged so that the film is automatically rewound progressively during movement of the film as it is unwound from the reel are provided. Said film reels can be of any suitable construction, for example, like the film reels shown in our application Serial No. 340,306 for improvements in Selective automatic apparatus for reproducing images from records thereof. Said film reels 22 are mounted in stationary position within the cabinet on individual brackets 24 fixed to the rear wall 26 of the cabinet.

Figure 3:
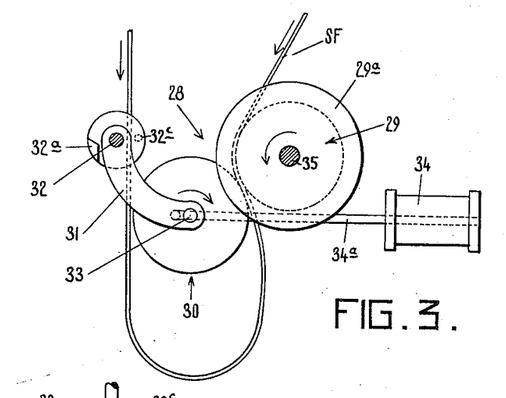
Fig. 3 is a side view of the film-moving means.
Figure 4:
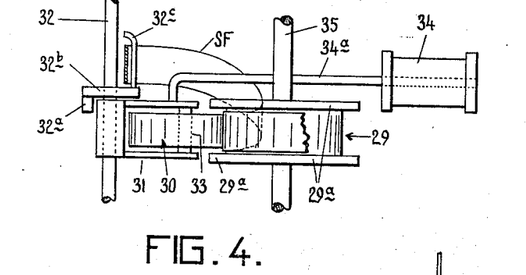
Fig. 4 is a top view of the film-moving means.

A film-moving device 28 is associated with each self-winding reel 22 and is mounted therebelow. Said film moving devices 28 comprise companion sets of rollers 29 and 30, respectively. Said rollers are friction rollers and for that purpose are preferably formed of rubber. Rollers 29 is provided with flanges 29a for preventing lateral displacement of the film in relation to said rollers. Roller 30 of each companion set of rollers is carried by a bracket 31 pivotally mounted on a rod 32. Said roller 30 is fixed to a shaft 33 which is journalled for rotation in bracket 31 whereby said roller is mounted for rotation. As clearly shown in Figs. 3 and 4, roller 30 is positioned to engage film SF and for that purpose is movable into the space between the opposed flanges 29a of roller 29. Roller 30 is movable to a retracted position out of engagement with the film or its companion roller 29, said movement of roller 30 to retracted position being limited by a pin 32a carried by a bracket 32b fixed on supporting rod 32. Said bracket 32b is also provided with a fixed guide finger 32c for guiding the film in its upward movement toward reel 22. Roller 30 is moved to projected position by suitable means selectively operable as hereafter described and comprises preferably as here shown an electro-magnet 34 having a plunger 34a pivotally connected to pivoted bracket 31. The arrangement is preferably such that when magnet 34 is energized plunger 34a is effective to move companion roller 30 to its projected or operative position in engagement with the companion film, while on the other hand, when said electro-magnet is de-energized movement of roller 30 to its retracted or inoperative position is permitted, said movement taking place under the action of gravity by reason of the weight of roller 30 and its supporting bracket.

Rollers 29 are driving rollers and are fixed to a rotary shaft 35 having its ends mounted in bearings 35a carried by the opposed end walls 36 of the cabinet. Shaft 35 is provided with a driving pulley 38 which, through belt 40, is driven by a pulley 42 fixed to a rotary shaft 44. Said shaft 44 is rotated by a motor 46 mounted on the bottom 48 of the cabinet. It will be understood that when shaft 35 is rotated driving rollers 29 are likewise rotated but that only the selected film will be moved as only the magnet 34 corresponding to the selected film will be energized for moving companion roller 30 to the operative position thereof, the other rollers 30 associated with the non-selected films remaining in their retracted or inoperative positions. Certain of the electric devices hereinafter to be referred to are preferably mounted in the casing 50 which as here shown is supported on the bottom wall 48 of the cabinet.

Figure 1:
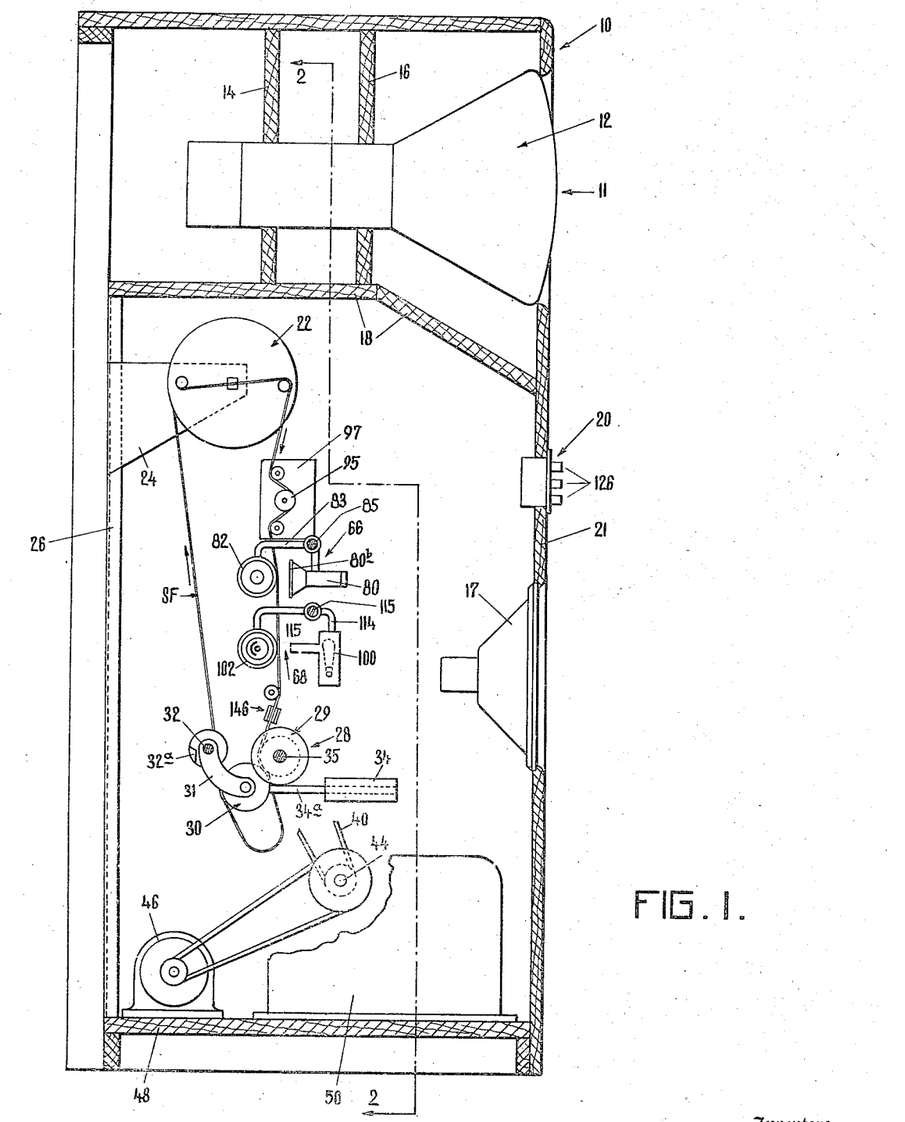
Fig. 1 is a vertical sectional view of apparatus embodying the present invention.
Figure 2:
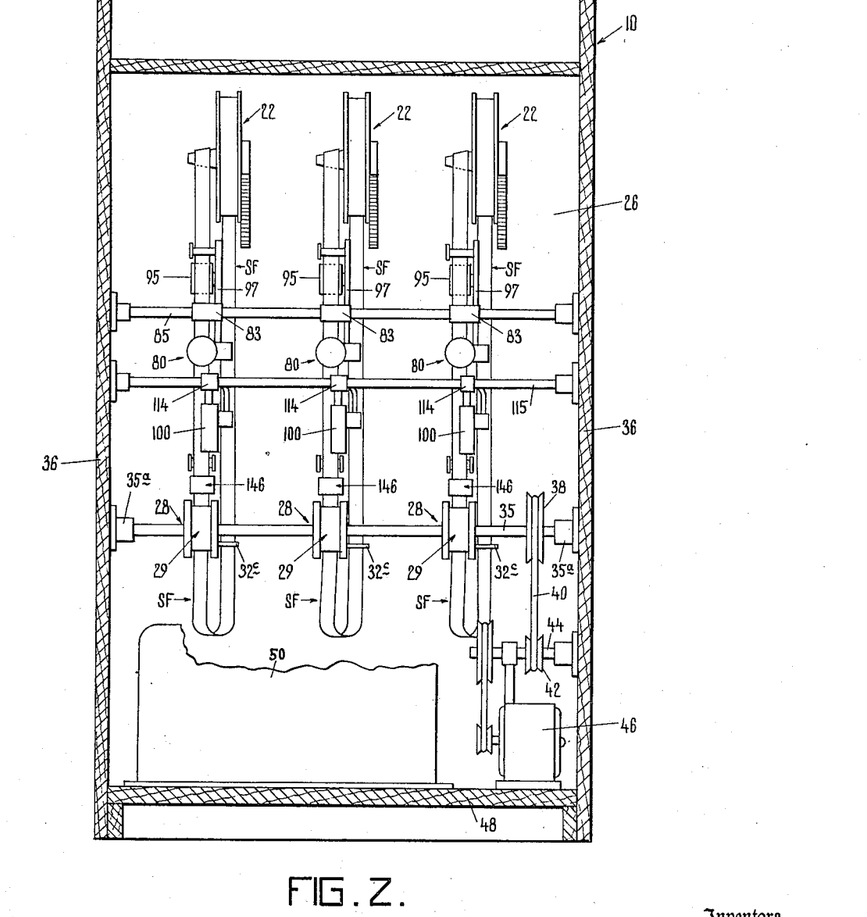
Fig. 2 is a sectional view on the line 2—2 of Fig. 1, with certain parts omitted for the sake of clearness of illustration.

As illustrated in Figs. 1 and 2, each film SF, which is preferably a motion picture film having a sound recording thereon, passes from the reel 22 to the picture pick-up device 66 and to the companion sound pick-up device 68 and between companion rollers 29 and 30 from which the film returns to the self-winding reel 22.

As hereinbefore stated, the motion picture record of each film SF is reproduced without optical projection apparatus. On the other hand, in accordance with the present invention the motion pictures are reproduced by apparatus of the television type. Thus, as here shown, the picture pick-up device 66 comprises a cathode ray tube 80 and a companion exciter lamp 82. Cathode ray tube 80 is preferably an iconoscope of the storage type having at its end which confronts the exciter lamp 82 a transparent conductive signal electrode and a photo-sensitive mosaic mounted on opposite surfaces, respectively, of a transparent sheet of insulation, the mosaic confronting the electron gun of the tube and the signal electrode confronting the exciter lamp 82. As is known the signal electrode is connected to an internal collector metal band adjacent the external metal band 80b which is operatively connected to kinescope 12. As the film SF is in motion during the scanning thereof by companion iconoscope 80 the latter can operate with a horizontal sweep only, the vertical sweep being unnecessary. This is accomplished by applying in a well known way an alternating current voltage to the horizontal-deflection plates or magnets of the cathode ray tube. Said tubes 80 are also preferably provided, however, with means for applying a direct current voltage to the vertical deflection means, that is, to the horizontal plates or magnets for adjusting the vertical position of the horizontal trace. Companion exciter lamp 82 can be positioned in a housing provided with a narrow horizontal slit extending transversely of the plane of the film SF. It will be understood that vertical adjustment of the sweep is intended only for adjusting the horizontal line or trace in respect to the companion photo-lamp 82. It will be observed that the vertical sweep of the cathode ray scanning tube 80 is unnecessary for scanning purposes in view of the vertical movement of the film SF in relation to its companion pick-up device 66.

Figure 9:
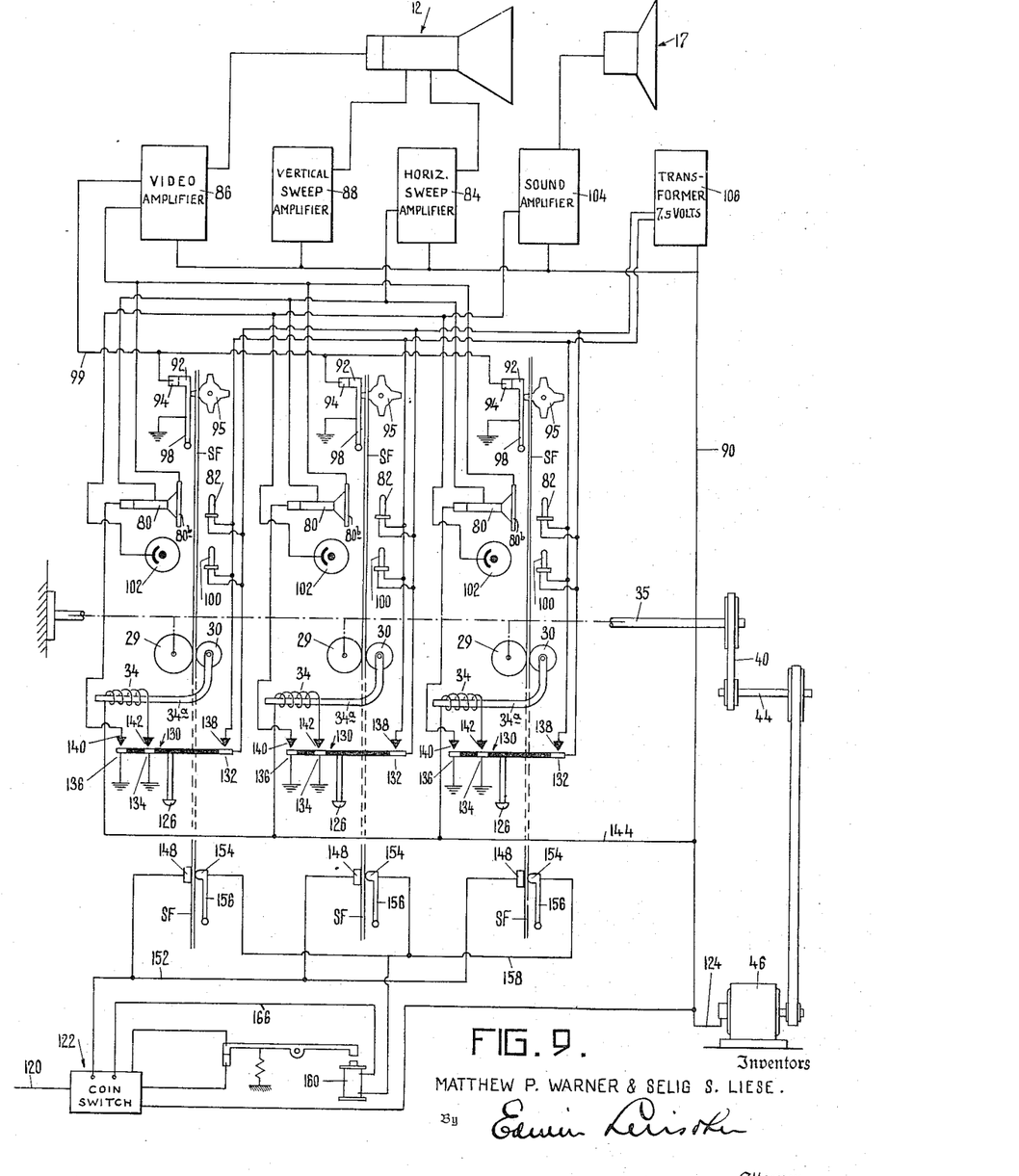
Fig. 9 is a block diagram, partly schematic, of the electrical apparatus, and also illustrates more or less diagrammatically the mechanical devices of the apparatus.

As shown more or less diagrammatically in the block diagram of Fig. 9, each cathode ray scanning tube 80 is connected to a horizontal sweep amplifier 84 which is also connected to the horizontal sweep control of the cathode ray vision tube 12. The signal electrodes of tubes 80 are connected through bands 80b, respectively, to the picture or video amplifier 86 which is connected to the grid of said vision tube 12. The vertical sweep amplifier 88 is connected to the vertical controls of the vision tube 12 but not to the pick-up device 66. Said amplifiers 84, 86 and 88 derive their energizing currents and potentials from a suitable source of alternating current supplied thereto over the line 90 under the control of selectors and other control devices as will hereinafter be described.

Figure 10:
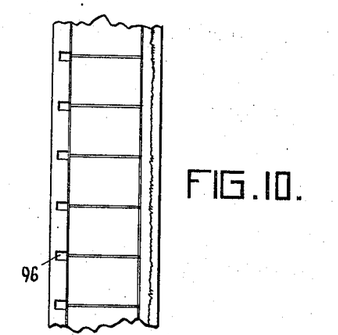
Fig. 10 is a front view of part of a motion picture film.
Figure 11:
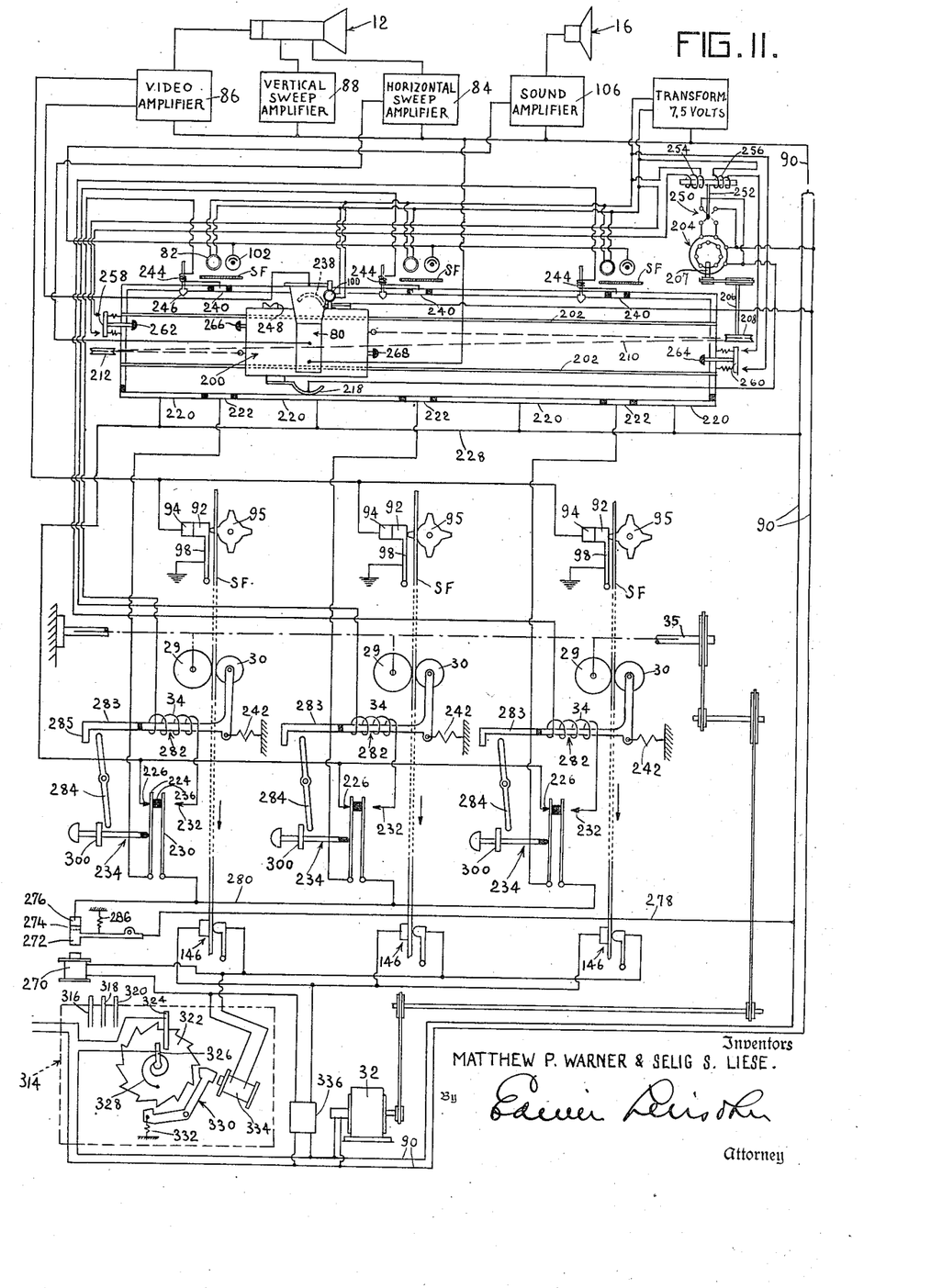
Fig. 11 is a view similar to Fig. 9 illustrating another form of the invention, according to which the cathode ray pick-up or transmitting tube is selectively movable in relation to the films.
Figure 12:
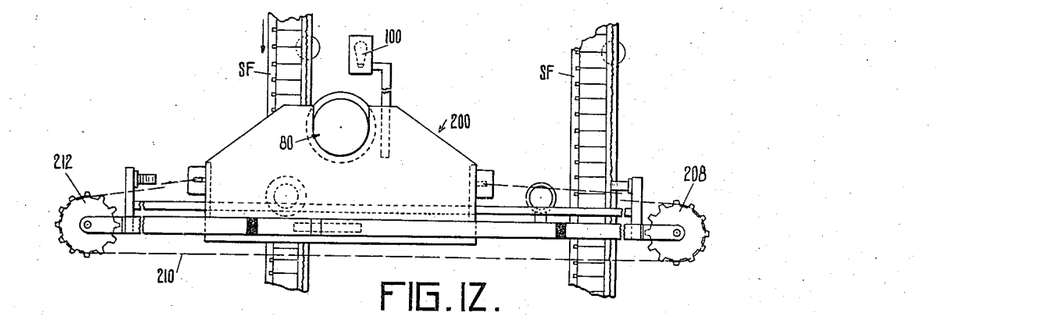
Fig. 12 is a side view of the movable carriage and associated parts for the cathode ray pick-up tube.
Figure 13:
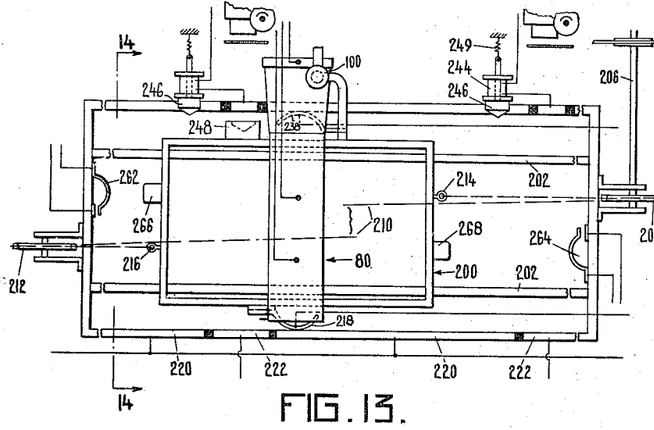
Fig. 13 is a top plan view of the carriage and associated parts illustrated in Fig. 12.
Figure 14:
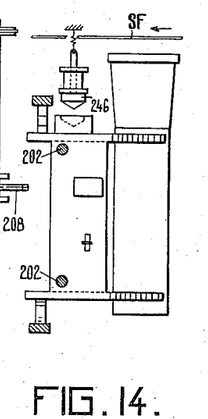
Fig. 14 is a sectional view on the line 14—14 of Fig. 13.

The blanking out operation between frames of the films SF is accomplished as here shown by relatively movable companion contacts 92 and 94 under the control of a companion film engaging sprocket 95 as illustrated more or less diagrammatically in Fig. 9 considered with reference to Fig. 10. Thus, as here shown, the sprocket openings 96 of the film SF are disposed on the lines between successive frames of said film. Accordingly, when said film is moved by its companion sprocket the teeth of said sprocket project through said openings 96 and in the arrangement here shown, one of said teeth in projecting through an opening 96 engages the spring arm 98 on which movable contact 92 is carried and, only at the times the lines between frames passes tube 80, causes said contact 92 to engage the companion contact 94 to close a circuit which includes the line 99 which is connected in the grid circuit of the vision tube 12. Accordingly in the scanning operation, the grid of vision tube 12 is grounded and no trace either vertical or horizontal appears on the fluorescent screen of said tube when the parts of the film between the frames thereof are in position to be scanned by cathode ray tube 80. It will be understood that contacts 92 and 94 are normally open, contact 92 being biased to open position by its companion spring strip 98. Any other suitable device known in the television art for accomplishing the blanking out operation between frames on the film can be used in lieu of that hereinbefore described. Also, in lieu of the described device there can be used an electron tube constructed and arranged to produce pulses of a frequency corresponding to the movement of the film in frames per second and to supply said pulses to the pick-up tube 80 or to the line connected to said band whereby to prevent the said tube 80 from transmitting signals during the times the parts of the film between frames pass the pick-up device.

It will be understood that the length of the scanning line or trace of pick-up tube 80 is regulated so that it does not extend into the sound recordings on the film and further it will be understood that although the length of the horizontal line or trace of tube 80 is relatively short, being in proportion to the picture width of the film SF, the horizontal line or trace reproduced on the viewing screen of the vision tube 12 is much longer, being amplified to the extent desired, within well known practical limits, by the horizontal sweep amplifier 84. Such lengthening of the horizontal trace on the screen of the vision tube 12 being more especially necessary or desirable when the viewing tube is substantially larger than the pick-up tube and is disposed in the cabinet so that the fluorescent screen thereof is viewed directly. Pick-up devices 66 are carried by brackets 83 fixed on a supporting rod 85. Said supporting rod also carries brackets 97 on which the sprockte wheels 95 are rotatably mounted, it being understood that said sprocket wheels are rotated by the companion films SF during the movement of the latter by the companion moving devices 28, respectively.

The sound pick-up device 68 can be of any suitable construction, and as here shown, includes an exciter lamp 100 and a companion photoelectric cell 102. As illustrated in Fig. 9, the photo-electric cells 102 are connected to the sound amplifier 104 which is connected to the loud speaker or sound reproducer 16. The exciter lamps 100 are energized by the step-down transformer 106 supplied from line 90. The exciter lamps 82 of the picture scanning tubes are also energized from line 90 through transformer 106. The sound pick-up devices 68 are carried by brackets 114 mounted on a supporting rod 115.

As hereinbefore indicated, provision is made for selecting the film SF to be reproduced in the operation of the apparatus and preferably the operation of the apparatus is coin-controlled. For this purpose the line 90 which supplies the electric energy to the various operating or control parts of the apparatus is connected to the alternating current supply line 120 under the control of a coin-controlled switch mechanism 122 as diagrammatically illustrated in Fig. 9. A branch line 124 connects motor 46 to line 90 whereby said motor is also actuated under the control of the coin-controlled switch mechanism 122. The means for selecting the film SF to be reproduced comprises a plurality of buttons 126 which together with the coin-controlled switch mechanism 122 form part of the selector 20. Each button controls a circuit for the cathode ray tube 80 of the vision pick-up device 66, the circuit of the exciter lamp 100 of the sound pick-up device 68, and a circuit for the solenoid 34 of the companion film moving device 28 for each film SF. Each button is connected to a movable contact member 130 which is provided with three conducting portions 132, 134, and 136, respectively, said contact portions being insulated from each other. Contact portion 132 is engageable with a stationary contact 138 for closing the circuit from transformer 106 through exciter lamps 82 and 100. Contact portion 136 is engageable with a stationary contact member 140 for connecting companion cathode ray scanning tube 80 to the circuit, contact portion 136 being connected to ground as illustrated and it being understood that for the purpose of explanation said ground connection is to be considered as one side of the circuit. Contact portion 134 is adapted to engage a stationary contact 142 to complete the circuit through the companion solenoid 34 which, as here shown, is connected to the branch line 144 which receives current from line 90. Contact portion 136 is illustrated as connected to ground and it will be understood that the other side of supply line 90 may be considered as connected to ground for completing the circuit. Thus when a coin is inserted in coin-controlled switch mechanism 122 and when a selected button 126 is actuated, the proper pick-up devices are activated and the apparatus is automatically operated to reproduce the motion picture film on the viewing screen 11 of tube 12 and at the same time the companion sound record which ordinarily is on the film is reproduced by the sound speaker 16.

Figures 5, 7:
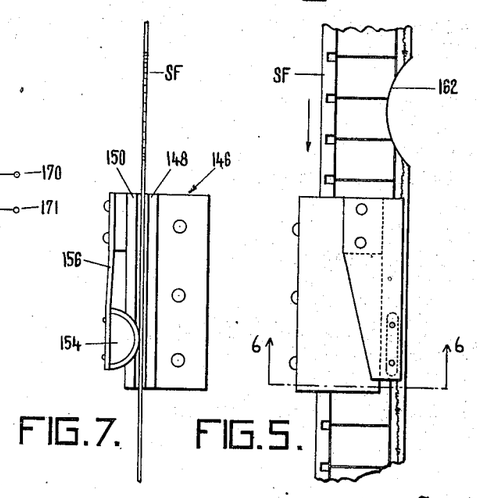
Fig. 5 is a front view of a film-controlled circuit maker and breaker.
Fig. 7 is an end view of the film-controlled circuit maker and breaker.
Figure 6:
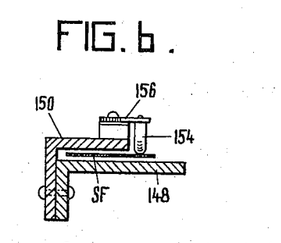
Fig. 6 is a sectional view on the line 6—6 of Fig. 5.

Provision is made for automatically interrupting the operation of the apparatus at the end of the reproduction of the selected film, and for conditioning the apparatus for the next operation to be initiated by the insertion of another coin. This is accomplished by the provision of a film controlled switch in conjunction with the coin-controlled switch mechanism 122 as will now be described, reference being had to Figs. 5 to 8 in conjunction with Fig. 9. The film controlled switch 146 comprises a guide passage formed by plates 148 and 150 between which the companion film SF passes during the movement thereof. Plate 148 is electrically connected to a line 152 leading to switch mechanism 122. A movable contact memebr 154 is carried by a spring strip 156 fastened to but insulated from plate 150 and electrically connected to line 158 in the circuit of electro-magnet 160. The arrangement is such that film SF normally prevents contact member 154 from engaging plate 148 but when the cut out portion 162 of the film (Fig. 5) which is arranged in the film at the part thereof near the end of the picture record passes contact member 154 the latter engages contact plate 148 to complete a circuit through electro-magnet 160. Line 152 is connected at a terminal 164 of switch 122 and line 166 which is connected to one end of the winding of magnet 160 is connected to terminal 168 of switch 122.

Figure 8:
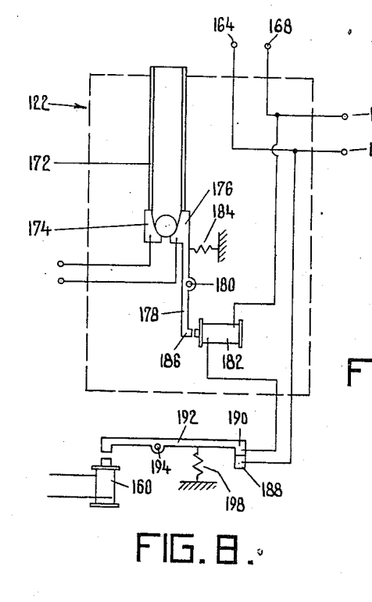
Fig. 8 is a schematic view of a coin-controlled switch mechanism.

As illustrated in Fig. 8, terminals for connecting switch 122 to the supply line 120 are indicated at 170 and 171. In Fig. 8 the coin chute is indicated more or less diagrammatically at 172. Said chute comprises stationary and movable contacts 174 and 176, respectively electrically connected by wires (not shown) to the input terminals 170 and 171, respectively. It will be understood that contact members 174 and 176 of coin chute 172 are connected to the opposite sides respectively of line 90 and that a circuit is completed through said line only when a coin is inserted in chute 172 and is positioned between contact members 174 and 176. Consequently after the reproduction of a selected record SF is completed, coin-controlled switch mechanism 122 is operated to eject the coin whereby to interrupt the circuit of line 90. For this purpose contact member 176 is mounted on a lever 178 pivoted at 180. Said lever is controlled by an electro-magnet 182 and by a spring 184. When magnet 182 is energized the armature 186 on the end of lever 178 is attracted and actuates said lever for moving contact member 176 to its projected or coin-retaining position, but when said magnet is de-energized spring 184 moves lever 178 to retracted or coin-releasing position. Magnet 182 is de-energized momentarily under the control of magnet 160. More specifically, the winding of magnet 182 is connected to input terminal 170 and through stationary and movable contact members 188 and 90, respectively, to input terminal 171. Movable contact member 190 is carried by a lever 192 pivoted at 194. When magnet 160 is energized, the armature 196 at one end of lever 192 is attracted thereby disengaging contacts 188 and 190, said contacts being normally held in circuit-closing position by a spring 198 which also is effective to return lever 192 to circuit-closing position after magnet 160 is de-energized.

As hereinbefore stated, magnet 160 is energized under the control of any one of the film controlled switches 146. It will be understood, however, that the energization of magnet 160 is only momentary, that is, only for a sufficient length of time, which is short, to permit operation of coin release magnet and lever 178 near the end of the operation of the reproduction of the companion film SF. Due to inertia, the film continues to move a short distance after the cut out portion 162 thereof reaches contact member 154 of the film controlled switch whereby the film again moves between and separates contact 154 from contact 148 thereby interrupting the circuit of magnet 160 and permitting lever 192 to return to normal switch-closing position thereby completing the circuit through the energizing magnet 182 for returning coin-releasing member 176 of the coin chute to coin-retaining position. Accordingly when a coin is inserted for the next operation of the apparatus, said coin completes a circuit through contact members 174 and 176 to line 90 for energizing the apparatus, and as soon as the selected button 126 is actuated the selected film and the accompanying sound record are reproduced as hereinbefore described. It will be understood that selector switches 130 can be interlocked in any well known manner so that only one switch can be actuated at any one time, a description of such mechanisms being unnecessary as numerous selectors are well known to those skilled in the art.

Referring now to the form of the invention illustrated in Figs. 11 to 16, provision is made for utilizing a single cathode ray pick-up or transmitting tube 80 in lieu of the plurality of such tubes provided in the form of the invention hereinbefore described. Also, in accordance with this form of the invention the sound pick-up means can include a single exciter lamp and light slit device in lieu of the plurality of such lamps and associated light slit devices provided in the above described form of the invention. Also, in this form of the invention provision is made for operating the apparatus to reproduce automatically and selectively a plurality of records in succession one after the other, depending upon the coin or coins inserted in the coin device of the apparatus. The manner in which the selective movement of the cathode ray pick-up tube and the selective operation of the apparatus for reproducing a plurality of films automatically upon the deposit of the proper coin or coins will now be described.

A pick-up tube 80 is mounted in position on a carriage 200 mounted for reciprocation in respect to the films SF on longitudinally extending parallel rods 202. Said carriage is reciprocated by a single phase reversing motor 204 which is operatively connected to the carriage by appropriate mechanisms including a rotary shaft 206 driven by the motor shaft 207 at the proper speed. A pulley or sprocket wheel 208 is fixed to and rotated by shaft 206 and drives a belt or sprocket chain 210 which passes over sprocket wheel 208 and a second sprocket wheel 212 and is connected at its opposite ends respectively to carriage 200 as indicated at 214 and 216. Carriage 200 is provided with a wiping contact member 218 which during the reciprocation of the carriage slidingly engages stationary conductor bars 220 and conductor bars 222, bars 222 being insulated from bars 220 and each bar 222 being insulated from each of the other of said bars. Bars 220 are connected to the supply line 90 and through the wiper 218 to motor 204 for energizing the latter. Bars 222 are supplied with current from line 90 through companion sets of normally closed spring contact members 224, 226 connected to bars 222, respectively, and to branch line 228, the latter being connected to one side of line 90. It will be understood that when contacts 224 and 226 are closed current is supplied to motor 204 through bars 222 and contact member 218 and that when said contacts 224 and 226 are open the supply of current to the motor is interrupted. Bars 220 are connected directly to one side of the line 90 through branch line 228.

A set of normally open spring contacts 230, 232 is associated with each set of normally closed contacts 224, 226 and both sets of contacts are operated under the control of a push button device 234 forming part of the selector mechanism. An insulation push piece 236 is connected to spring contact 224 in position to engage spring contact 230 and to engage said spring contact with companion contact member 232 when contacts 224 and 226 are separated. Thus when push rod 234 of the corresponding set is projected, contacts 224 and 226 are automatically separated and contacts 230 and 232 are automatically engaged. It will be observed that contacts 230, 232 control the circuit of magnet 34 of the film driving roller set 29, 30 described above in reference to the form of the invention illustrated in Fig. 9. Each film roller magnet 34 is controlled not only by contacts 230, 232 but also by a wiper 238 carried by carriage 200 in position to engage stationary contact members 240 positioned at film stations corresponding to the several films SF respectively.

Film roller 30 is moved to retracted position, out of engagement with the film by a spring 242 when magnet 34 is deenergized. Thus when a selected push rod 234 is projected inwardly the circuit to motor 204 through the corresponding bar contact 222 is interrupted whereby the carriage is brought to rest when wiper 218 engages said corresponding contact bar 222. Also, when the carriage reaches a de-energized contact bar 222 a circuit is completed through wiper 238 and corresponding contact member 240 and through contacts 230, 232 of the corresponding push button whereby to complete a circuit through magnet 34 and through a carriage positioning solenoid 244. When the winding of solenoid 244 is energized, a plunger or detent 246 is projected and engages in a recessed member or keeper 248 fixed to the pick-up tube carriage 80, thus positioning pick-up tube 80 in registered operative relation to the selected film SF. Upon de-energization of solenoid 244 plunger 246 is retracted by a spring 249. At each film station there are the exciter lamps 82 for the pick-up tube 80 and the photo-electric cell 102 for the companion exciter lamp and sound slit device 100 which is also carried by carriage 200 and is of course movable therewith to the selected film. It will be understood that the sound pick-up 100 is positioned for registry with the sound track of the film a sufficient number of frames in advance of the picture take-off.

Carriage 200 is reciprocated continually by motor 204 under the control of a reversing switch 250 having an actuator arm 252 moved in opposite directions by magnets 254 and 256, respectively. The circuits of said magnets 254 and 256 are controlled by normally open switches 258 and 260 having push buttons 262 and 264 respectively in position to be engaged by push members 266 and 268 positioned at the opposite ends of carriage 200 so that said switches 262 and 264 are alternately closed when the carriage reaches the end of its movement in one direction. It will be understood that when line 90 is energized, motor 204 is operated and is effective to reciprocate carriage 200 and that such reciprocation takes place at all times except when wiper 218 engages a non-energized conductor bar 222. As hereinbefore stated, conductor bars 222 are de-energized by the film selector mechanism including the push rods 234, there being one of such push rods for each film.

Upon the completion of the reproduction of a selected record the corresponding conductor bar 222 is again energized whereby to supply current to motor 204 for moving carriage 200 to its next station corresponding to a selected film. This is accomplished under the control of the companion film switch 146 described above, all of said film switches controlling the circuit of an electro-magnet 270 which attracts a companion armature 272 thereby disengaging the contact 274 carried by said armature from a companion stationary contact 276. Contact 274 and 276 are connected to lines 278 and 280 and control the supply of current to spring contact members 230 for controlling the circuits of magnets 34 and solenoids 244. Thus when contacts 274 and 276 are opened, solenoid 34 is de-energized thereby permitting roller 30 to move to retracted position under the force of companion springs 242 connected to the solenoid plunger 282. Upon movement of roller 30 to retracted position, the non-magnetic section 283 of plunger 282 is retracted, that is, moved to the right viewing Fig. 11, whereby the end 285 of the plunger engages a pivoted lever 284 for moving the latter clockwise (viewing Fig. 11). Upon this movement of lever 284 push rod 234 is moved to the left thus permitting spring contacts 224, 226 to close and thereby energizing the companion conductor bar 222. It should be noted that when push rod 234 is projected, lever 284 engages the end 285 of the solenoid plunger 282 thereby moving the latter to the left but this movement is insufficient to engage roller 30 with the film, said roller engaging the film only when winding 34 is energized. It will be observed that when solenoid 34 is de-energized solenoid 244 is likewise de-energized, thus permitting the companion solenoid spring 249 to retract plunger or detent 246 from the recessed member or keeper 248, and when this occurs carriage 200 is free to move and does move since conductor bar 222 then engaged by wiper 218 supplies current to motor 204. It will be understood that after film switch 146 is closed at the end of the reproduction of said film, as just described, said film switch is, after a short time, again opened, as described above as the film continues to move a short distance after magnet 34 is de-energized. Magnet 270, being then de-energized, permits movable contact member to be moved to closed position by its spring 286. Thereafter when carriage 200 reaches a segment 222 the circuit of which has been interrupted by the projection of the corresponding push rod 234, said carriage comes to a stop at the selected film station in operative relation to the selected film whereupon said film is reproduced. This cycle is repeated for each selected film.

Figures 15, 16:
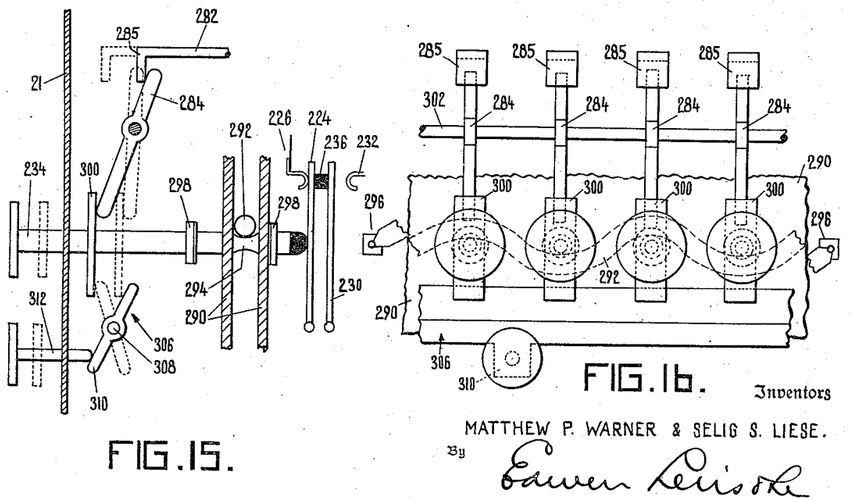
Fig. 15 is a side view of part of the selector mechanism provided in the form of the invention illustrated in Fig. 11.
Fig. 16 is a front view of the selector mechanism illustrated in Fig. 15, the front wall of the cabinet being omitted for the purpose of illustration.

The selector mechanism including a plurality of the push rods 234, one for each film, is illustrated more in detail in Figs. 15 and 16. Said selecting mechanism is mounted on the front wall 21 of the cabinet in lieu of the selector 20 hereinbefore described and in conjunction with a coin-controlled switch 288 hereafter to be referred to. Rods 234 are mounted for reciprocation in spaced plates 290. A spiral spring 292 is disposed between plates 290 and engages rods 234 in a groove 294 formed in said rods, respectively. Said spring is fixed at its opposite ends to fixed members 296 and frictionally engages rods 234 to hold the latter releasably in their retracted or projected positions. Each rod is provided with a pair of stops 298 fixed thereto in position to engage the outer sides of adjacent plates 290 for limiting the movement of each rod to their projected and retracted positions. In Fig. 15 rod 234 is shown in retracted position being releasably held in said position by spring 292 which engages said rod in groove 294. Each rod 234 is provided with a fixed collar 300 which is engaged by a companion lever 284. Levers 284 are pivotally mounted on a rod 302.

The selector mechanism is provided with resetting means, i. e., with means for returning all of the push rods simultaneously to retracted position. For this purpose a lever bar 306 is pivotally mounted in position to engage collars 300 on all of the push rods 234 which have been projected or set for selecting the corresponding films. Said bar is pivoted as indicated at 308 and is provided with an arm 310 in position to be engaged by a push rod 312. Accordingly in the event that after one or more push rods 234 have been projected, and it is desired to cancel the selection of films before the playing of one or more of the selected films it is merely necessary to project push button 312 for engaging pivot bar 306 with collars 300 for moving said push rods 234 to retracted position.

After all of the selected films have been reproduced the main circuit is interrupted and the apparatus does not operate until one or more coins are inserted in the coin controlled mechanism. Any suitable coin controlled switch mechanism can be utilized in the present apparatus. Said mechanism is indicated more or less schematically at 314 in Fig. 11. Said coin controlled mechanism includes a plurality of coin slides 316, 318 and 320 ordinarily for nickels, dimes and quarters, respectively. An indexing toothed wheel 322 is mounted for rotation and by suitable mechanism (not shown) is turned automatically in a counter-clockwise direction an amount corresponding to the value of the coin or coins inserted in the coin mechanism by the coin slides, the maximum turning of said wheel 322 being one revolution. It will be understood that when a nickel is inserted in the coin device, wheel 322 is turned counterclockwise a distance corresponding to one tooth thereof and correspondingly a greater distance for each additional nickel; that when a dime is inserted said wheel 322 is turned counter-clockwise a distance corresponding to two teeth and correspondingly for each additional dime; and that when a quarter is inserted, the wheel is turned a distance corresponding to five teeth, and a distance of ten teeth when two quarters are inserted; but, as stated the wheel can turn only one revolution.

As here shown, said wheel 322 has twelve teeth, so that when it is turned one revolution, counterclockwise it controls the reproduction of twelve films for which the present apparatus can be equipped, although only four films are indicated for the purpose of illustration. It will be understood further that provision can be made for more than twelve films or for less than four films.

Said indexing wheel 322 controls the main switch of the apparatus including the stationary contact member 324 and the movable contact member 326, the arrangement being such that as soon as a coin of any denomination is inserted by the slide of the coin device, movable contact member 326 engages stationary contact member 324 and completes a circuit through the motor 32 and the main line 90. After each film is reproduced, wheel 322 is turned clockwise one step by a spring 328 under the control of a pawl 330 which in turn is normally projected by a spring 332. When pawl 330 is projected by spring 332 it prevents rotation of wheel 322 in a clockwise direction but permits movement of said wheel in the opposite direction. When wheel 322 is turned counter-clockwise, coil spring 328 is stressed and conditioned for turning said wheel clockwise when pawl 330 is retracted. Said pawl is a double acting pawl and permits only step rotation of wheel 322 in a clockwise direction but permits continuous rotation of said wheel in the opposite direction and is retracted by an electro-magnet 334. Said electro-magnet 334 is in the circuit of the winding of magnet 270 and receives a pulse each time a film switch 146 is closed, said film switch being closed as described above at the end of the reproduction of the film. As here shown, a stepdown transformer 336 supplies an appropriate low voltage to electro-magnets 270 and 334. Contacts 324 and 326 remain closed until the indexing wheel is returned step-by-step by spring 328 to initial or zero position upon reproduction of all of the selected films paid for by the insertion in the coin device of one or more coins of the proper value. When the index wheel is returned to zero position the contacts 324 and 326 are automatically opened and the operation of the apparatus is terminated. It will be understood that coin controlled mechanism 314 has been illustrated only schematically and that no detailed description thereof is necessary as it is not per se part of the present invention and, as stated above, can be any coin controlled switch.

While we have shown and described two forms of the invention it will be understood that the latter is capable of numerous other specific embodiments and may comprise various electrical and mechanical devices which are different from the said devices herein specifically illustrated or described. Also, it is within the scope of the present invention to utilize a plurality of kinescopes arranged at various points out of the cabinet which contains the pick-up means whereby the picture reproductions can be viewed at various points in a room or in different rooms of a building. Further, it will be understood that in lieu of cathode-ray scanning tubes it is within the scope of this invention to utilize other scanning devices. Further it will be understood that while the continuous motion of the films is preferred, said films can be moved intermittently and scanned frame by frame in which case when one or more cathode-ray pick up tubes are used such tube or tubes can be operated for vertical deflection as well as horizontal deflection, it being observed in this connection that when the film is moved continuously as preferred in accordance with the present invention only horizontal deflection in the operation of the cathode ray pick-up tube is required as described above. Various other changes in the physical embodiments of the invention and in the methods of practicing the same may be made and will occur to skilled artisans in view of the present disclosure. Accordingly we do not wish to be limited to the physical embodiments herein shown or described, or to the methods illustrated or described herein except to the extent which may be required by the scope of the appended claims.

Having thus described our invention, what we claim and desire to secure by Letters Patent is:

1. Apparatus of the character described comprising a cathode-ray vision tube, means for mounting in spaced relation a plurality of separate picture-records to be reproduced one at a time, means for selectively reproducing said records including said vision tube and picture pick-up means operatively connected to said tube and arranged to be operatively associated with said records when the latter are operated, said picture pick-up means including a cathode ray tube selectively movable in relation to said records to position the same in operative relation to the record to be reproduced, means operable to move said pick-up tube to a plurality of such positions in succession, and means automatically actuated in response to said movements of said pick-up tube for operating said records one at a time in succession when said pick-up tube is moved to said positions, respectively, in which the pick-up tube is in operative relation to said records.

2. Apparatus of the character described comprising a plurality of film stations at which a plurality of separate sound-on-film records are individually movable, respectively, sound pick-up means arranged for cooperation with said records for the reproduction thereof and including a part mounted for movement to any one of said film stations and a plurality of stationary companion parts, one at each film station, and means for selectively moving said first mentioned part to an operative position in relation to any one of said records and the companion stationary parts, respectively, of said pick-up means.

3. Apparatus of the character described comprising a cathode-ray vision tube, means for mounting at a plurality of stations a plurality of picture-records, respectively, to be reproduced one at a time, means for selectively reproducing said records including said vision tube and picture pick-up means including a pick-up tube operatively connected in said vision tube and arranged to be operatively associated with said records, respectively, when the latter are operated, means for selectively positioning said pick up tube in operative relation to said records, respectively, electrical means for operating said positioning means, and means including a selector mechanism for controlling the operation of said electrical means for operating said positioning means.

4. Apparatus of the character described comprising a cathode-ray vision tube, means for mounting at a plurality of stations a plurality of picture-records, respectively, to be reproduced one at a time, means for selectively reproducing said records including said vision tube and picture pick-up means including a pick-up tube operatively connected to said vision tube and arranged to be operatively associated with said records when the latter are operated, means for selectively positioning said pick up tube in operative relation to said records, respectively, and means including an electric motor and a selector mechanism for controlling the operation of said positioning means.

5. Apparatus of the character described comprising a cathode-ray vision tube, means for mounting a plurality of picture-records to be reproduced, means for selectively reproducing said records including said vision tube and picture pick-up means operatively connected to said tube and arranged to be operatively associated with said records when the latter are operated, means for selectively positioning said pick up means in operative relation to said records, respectively, said positioning means including a movable carriage, means for moving said carriage, and means operable automatically at least in part under the control of said carriage for controlling the operation of said carriage moving means.

6. Apparatus of the character described comprising a cathode-ray vision tube, means for mounting a plurality of picture-records to be reproduced, means for selectively reproducing said records including said vision tube and picture pick-up means operatively connected to said tube and arranged to be operatively associated with said records when the latter are operated, and means for selectively positioning said pick up means in operative relation to said records, respectively, said positioning means including a movable carriage, electrical means for moving said carriage, a plurality of electrical contact members arranged in spaced relation in the direction of movement of said carriage, a movable electrical contact member engageable with said contact members under the control of said carriage, a circuit containing said electrical means and controlled in part by said first mentioned contact members and by said movable contact members, a plurality of sets of circuit making and breaking contact members in said circuit in series, respectively, with said first mentioned contact members, and a plurality of members selectively operable for actuating said circuit making and breaking contact members.

7. Apparatus of the character described comprising a cathode-ray vision tube, means for mounting a plurality of picture-records to be reproduced, means for selectively reproducing said records including said vision tube and picture pick-up means operatively connected to said tube and arranged to be operatively associated with said records when the latter are operated, and means for selectively positioning said pick up means in operative relation to said records, respectively, said positioning means including a movable carriage, electrical means for moving said carriage, a plurality of electrical contact members arranged in spaced relation in the direction of movement of said carriage, a movable electrical contact member engageable with said contact members under the control of said carriage, a circuit containing said electrical means and controlled in part by said first mentioned contact members and by said movable contact members, a plurality of sets of circuit making and breaking contact members in said circuit in series, respectively, with said first mentioned contact members, and a plurality of members selectively operable for actuating said circuit making and breaking contact members, means for selectively operating said films, and means controlled by the position of said carriage and by said last mentioned selectively operable members for controlling said film operating means.

8. Apparatus of the character described comprising a plurality of film stations at which a plurality of film records are individually movable, pick-up means arranged for cooperation with said records for the individual reproduction thereof, said pick-up means including a part movable to any one of said film stations in operative relation to the film at said station, selectively operable means for moving said part of the pick-up means to said film stations, normally inactive means associated with each of said films for moving the same, and manually operable means for selectively activating said film moving means, respectively, and for controlling the operation of said means for moving said part of the pick-up means to the selected film stations.

9. Apparatus of the character described comprising a plurality of film stations at which a plurality of film records are individually movable, pick-up means arranged for cooperation with said records for the individual reproduction thereof, said pick-up means including a part movable to any one of said film stations in operative relation to the film at said station, and selectively operable means for moving said part of the pick-up means to said film stations, manually operable means for controlling the operation of said means for moving said part of the pick-up means to said film stations, and electro-magnetically controlled means associated with each of said films operable under the control of said manually operable means for moving the same one at a time at the stations at which said part of the pick-up means is operatively positioned.

10. Apparatus of the character described comprising a plurality of film stations at which a plurality of film records are individually movable, pick-up means arranged for cooperation with said records for the individual reproduction thereof, said pick-up means including a part movable to any one of said film stations in operative relation to the film at said station, and selectively operable means for moving said part of the pick-up means to said film stations, normally inactive means associated with each of said films for moving the same, manually operable means for selectively activating said film moving means, respectively, and for controlling the operation of said means for moving said part of the pick-up means to the selected film stations, and means associated with each of said films and operable under the control thereof for restoring the inactive condition of the companion film moving means, respectively.

11. Apparatus of the character described comprising a plurality of film stations at which a plurality of film records are individually movable, pick-up means arranged for cooperation with said records for the individual reproduction thereof, said pick-up means inculding a part movable to any one of said film stations in operative relation to the film at said station, selectively operable means for moving said part of the pick-up means to said film stations, manually operable means for controlling the operation of said means for moving said part of the pick-up means to said film stations, electro-magnetically controlled means associated with each of said films operable under the control of said manually operable means for moving the same one at a time at the stations at which said part of the pick-up means is operatively positioned, and means associated with each of said films and operable under the control thereof for restoring the inactive condition of the companion film moving means, respectively.

MATTHEW P. WARNER.
SELIG S. LIESE.